United States Patent
Foster et al.

(10) Patent No.: US 10,584,399 B2
(45) Date of Patent: Mar. 10, 2020

(54) PROCESS AND SYSTEM FOR RECYCLING E-WASTE MATERIAL

(71) Applicant: Blueoak Arkansas, Osceola, AR (US)

(72) Inventors: Robert P. Foster, Osceola, AR (US); Steven N. Dixon, Osceola, AR (US)

(73) Assignee: BlueOak Arkansas, Osceola, AR (US)

( * ) Notice: Subject to any disclaimer, the term of this patent is extended or adjusted under 35 U.S.C. 154(b) by 36 days.

(21) Appl. No.: 15/653,623

(22) Filed: Jul. 19, 2017

(65) Prior Publication Data
US 2019/0024210 A1 Jan. 24, 2019

(51) Int. Cl.
*C22B 15/00* (2006.01)
*C22B 7/00* (2006.01)

(52) U.S. Cl.
CPC .......... *C22B 15/0056* (2013.01); *C22B 7/009* (2013.01); *C22B 15/0028* (2013.01)

(58) Field of Classification Search
CPC ..... C22B 7/003; C22B 7/001; C22B 15/0028; C22B 15/0056; Y02P 10/214; Y02P 10/22
See application file for complete search history.

(56) References Cited

U.S. PATENT DOCUMENTS

| | | | |
|---|---|---|---|
| 3,351,462 A | 11/1967 | Arentzen et al. | |
| 3,682,623 A * | 8/1972 | Dierckx | C22B 15/0052 75/629 |
| 4,107,009 A | 8/1978 | Everett | |
| 4,602,574 A * | 7/1986 | Bach | A62D 3/32 110/237 |
| 4,705,562 A | 11/1987 | Hedlund | |
| 5,052,312 A | 10/1991 | Rackley et al. | |
| 5,322,547 A * | 6/1994 | Nagel | A62D 3/32 75/414 |
| 7,465,843 B2 | 12/2008 | Gnedenko et al. | |
| 9,057,118 B2 | 6/2015 | Deegan et al. | |
| 9,441,284 B2 * | 9/2016 | Deegan | C22B 11/021 |
| 2013/0276585 A1 * | 10/2013 | Kim | C22B 7/04 75/631 |

FOREIGN PATENT DOCUMENTS

CN 203049010 U 7/2013
CN 203295586 U 11/2013
(Continued)

OTHER PUBLICATIONS

Kaya, Muammer. "Recovery of Metals from Electronic Waste by Physical and Chemical Recycling Processes." International Scholarly and Scientific Research & Innovation. vol. 10 No. 2. pp. 259-270. (Year: 2016).*

Primary Examiner — Tima M. McGuthry-Banks
(74) Attorney, Agent, or Firm — BakerHostetler (57) ABSTRACT

A method for recycling a material may include carrying out a first pass operation. The first pass operation may include preparing an E-waste material and a solid oxide material. The E-waste material may include Fe and Si. The first pass operation may include blending the E-waste material with fluxing agents. The first pass operation may include feeding a furnace with the blended E-waste material and the solid oxide material. The method may include smelting the blended E-waste material and the solid oxide material from the first pass operation to obtain a slag. The slag may include iron oxide and a molten metal. The molten metal may include copper.

29 Claims, 10 Drawing Sheets (56) References Cited

FOREIGN PATENT DOCUMENTS

| | | |
|---|---|---|
| CN | 104372175 A | 2/2015 |
| CN | 204265819 U | 4/2015 |
| CN | 105349787 A | 2/2016 |
| CN | 205275667 U | 6/2016 |
| JP | 57203729 A | 12/1982 |

* cited by examiner

PROCESS AND SYSTEM FOR RECYCLING E-WASTE MATERIAL

TECHNICAL FIELD

The disclosure relates to a method and a system for recovery of precious metals from electronic wastes. In particular, the disclosure is directed to controlling a reducing atmosphere to improve the overall technology efficiency during a smelting process.

BACKGROUND

Waste materials containing noble metals refer to waste components, waste residues and waste water, which contain gold, silver, platinum, palladium, rhodium, ruthenium, iridium and/or other noble metals. Because noble metals are rare and valuable but difficult to refine, there are economic and social benefits to recycle the waste materials containing such noble metals.

Waste printed circuit boards (PCBs) have an implicit value due to abundance of precious metals contained therein. Hence, the recovery of precious metals becomes necessary for an effective waste management or recycling process and the same has become an area of interest for the innovators and waste management/recycling industries.

The treatment techniques commonly used are mechanical crush, hydrometallurgy, pyrometallurgy or their combinations. Various methods are known in the art for recovering silver, gold and platinum group metals (PMG's) from separated metal containing concentrates and semi-products.

The two main approaches are either pyrometallurgy or hydrometallurgy. In the pyrometallurgy process, the precious metals-bearing scrap is melted to a high temperature where the metals are maintained and the connecting matrix, e.g. polymers, is burnt. Air emissions and fugitive gases are issues for all smelter processes and even more so for bath smelting and oxidation smelters.

In the hydrometallurgy process, the metals are freed from the matrix by immersing in an appropriate solution. However, many of the hydrometallurgical plants become constrained and continually deal with accumulations of bleed solutions. These bleed solutions are treated in wastewater treatment plants. Solids from bleed solutions must be hauled off site.

BRIEF SUMMARY

In view of the deficiencies of the current available processes used to extract precious metals, a more efficient and economical means must be developed. The disclosure is related to a process and a system for recovery of precious metals from electronic wastes (E-wastes), which greatly reduce the costs and issues with conventional recycling processes. The process in the disclosure operates a furnace with low fugitive gas and the installed system is capable of collecting off-gases and achieves high energy efficiency.

According to one example, a method for recycling a material is disclosed, the method including: carrying out a first pass operation, wherein the first pass operation includes preparing an E-waste material and a solid oxide material, wherein the E-waste material includes Fe and Si, blending the E-waste material with fluxing agents, feeding a furnace with the blended E-waste material and the solid oxide material, and carrying out smelting the blended E-waste material and the solid oxide material to obtain a slag including an iron oxide and a molten metal including copper.

In one example, the method further includes continuously feeding the furnace with the solid oxide material during the smelting, carrying out gasification for combustion of a calorific material in an oxygen reduced environment in the furnace, simultaneously injecting oxygen and water for the gasification to control the oxygen reduced environment in the furnace.

In another example, during the smelting, exothermic reactions (1) and (2) occur where $Fe_{(metal)}+CuO_{(solid)}=FeO_{(slag)}+Cu_{(metal)}$ (1) and $Si_{(metal)}+2CuO_{(solid)}=SiO_{2(slag)}+2Cu_{(metal)}$ (2), while maintaining the furnace at a temperature in a range of from about 1500° C. to 1630° C. during the smelting.

In another example, the method includes collecting a first pass dust generated during the first pass operation, and storing the first pass dust in a storage.

In another example, the method further includes carrying out a second pass operation, the second pass operation including blending the first pass dust with a raw E-waste material to produce a blended E-waste material and feeding the furnace with the blended E-waste material. The first pass operation and the second pass operation may be carried out sequentially. Depending on the E-waste composition, the dust may be continuously recycled.

In the disclosure, a system for recycling an E-waste material including Fe and Si is also disclosed, where the system includes an E-waste material blending unit where the E-waste material blending unit is configured to prepare the E-waste material, fluxing agents and a copper oxide material, and a furnace configured to carry out gasification and smelting the E-waste material and the copper oxide material to obtain a slag including iron oxide and a molten metal including copper.

In one example, the E-waste material blending unit includes four individual Loss-In-Weight hoppers configured to dispense the E-waste material, fluxing agents and copper oxide material into a conveyor.

In another example, the prepared E-waste material, fluxing agents and copper oxide material are conveyed to the furnace via a single drop chute connected to a roof of the furnace.

In another example, the system includes four injection nozzles radially installed on a headspace of the furnace to inject oxygen and water in the furnace and/or at least one injection nozzle installed on a headspace of the furnace and configured to simultaneously inject oxygen and water in the furnace where the water can be supplied by filtered wastewater from a hydrometallurgical plant to maintain a zero discharge and water balance.

In another example, the furnace is any form of induction furnace, electric furnace, blast furnace and plasma furnace.

In another example, the furnace is a plasma arc furnace.

In another example, the system includes a refining unit configured to produce a solid copper oxide material.

In another example, the system includes a thermal oxidizer configured to convert combustible gases and char exiting the furnace into a fully oxidized flue gas where the thermal oxidizer is further configured to operate at a temperature in the range of from about 850° C. to about 1100° C. and includes two sets of water spray nozzles. In one aspect, the spray nozzles may be supplied by filtered wastewater from a hydrometallurgical plant to maintain a zero discharge and water balance.

In another example, the system includes a high temperature-rated cyclone configured to remove a coarse fraction of dust generated during the gasification in the furnace.

BRIEF DESCRIPTION OF THE SEVERAL VIEW OF THE DRAWING

The above as well as other features and advantages of the present disclosure will become apparent through consideration of the detailed description in connection with the accompanying drawings in which.

DETAILED DESCRIPTION

The disclosure may be understood more readily by reference to the following description taken in connection with the accompanying Figures and Examples, all of which form a part of this disclosure. It is to be understood that this disclosure is not limited to the specific products, methods, conditions or parameters described and/or shown herein, and that the terminology used herein is for the purpose of describing particular examples by way of example only and is not intended to be limiting of any claimed invention. Similarly, unless specifically otherwise stated, any description as to a possible mechanism or mode of action or reason for improvement is meant to be illustrative only, and the disclosure herein is not to be constrained by the correctness or incorrectness of any such suggested mechanism or mode of action or reason for improvement.

In the disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth. When a value is expressed as an approximation by use of the descriptor "about," it will be understood that the particular value forms another example. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

Figure 1:
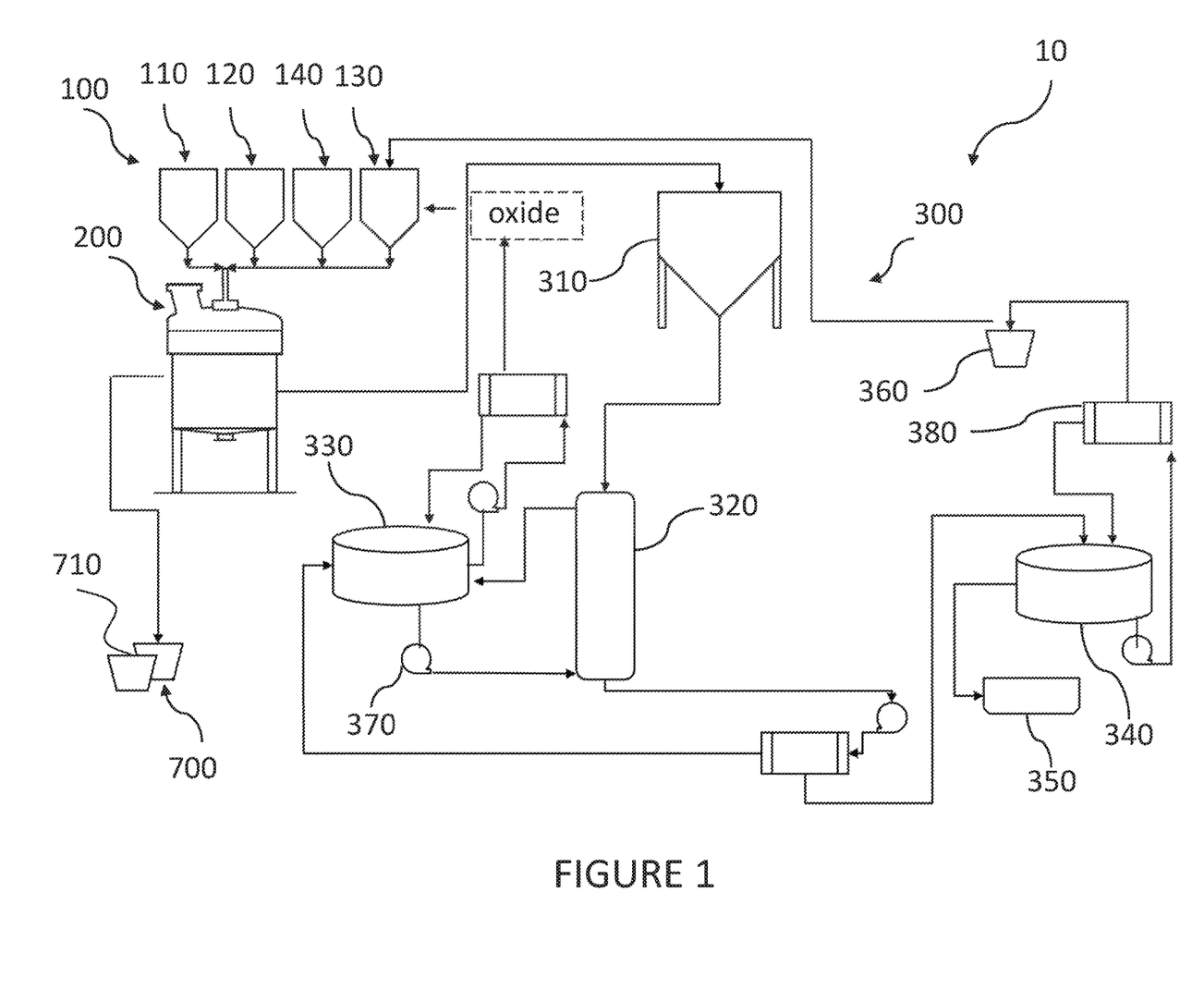
FIG. 1 shows a schematic diagram of a general layout of the process according to the disclosure.

Referring to FIG. 1, in one example of the disclosure, the F-Waste recycling system 10 includes an E-waste material blending unit or blender 100. Blending unit 100 generally combines E-waste with fluxing agents, as described more completely below. The E-Waste may arrive at the E-waste material blending unit 100 in a raw form and require processing to facilitate blending. Such processing may include taking lump E-waste material and processing it to a suitable particle size or consistency for mixing. In one example, the E-waste material blending unit 100 is capable of processing raw E-wastes 110 to provide suitable particle size or consistency for mixing. The raw E-waste may have lump sizes. Shredding, crushing, and grinding may be carried out in a sequential operation by which the lump size is reduced step by step. Screening which is mechanical separation of particles according to size may be carried out in conjunction with the crushing and grinding. Alternatively, E-waste 110 may be processed before arriving at the blending unit 100, such that the E-Waste is provided to the blending unit 100 in suitable form for blending. Such pre-processing of the E-waste may occur at the same facility in a separate step or at a separate facility.

The conforming shredded E-waste 110 as a feed material is blended with fluxing agents 120. Slags are in general understood as molten mixtures of metal oxides and silicates, sometimes with phosphates or borates. The slag collects some of the unwanted components in a metallic melt, and by the virtue of its immiscibility with the metallic melt a separation of these components from the wanted metal is obtained. In order to give the slag the desired melting point, viscosity, density, or chemical properties, the fluxing agents 120 are added. The fluxing agents 120 are formulated to lower the melting temperature as well as improve viscosity of a molten slag. The fluxing agents 120 may include lime. The blended feed material is conveyed and fed to a furnace 200 at a controlled rate.

A metal oxide may be reduced by means of another metal which has a higher oxygen affinity. Such metallothermic reactions may be carried out between solid or molten reactants at a lower oxygen pressure to give molten products. For the E-waste with a high content of Fe and/or Si, a solid oxide material 130 is fed to the furnace 200 to remove silicon, iron and other undesired impurities in the metal alloy to be recovered from the E-wastes 110. The blended material with the E-waste material 110 and the fluxing agents 120 may be further blended with the solid oxide material 130. The blended material may be further blended with off-gas dust 140. The blended material may be supplied to the furnace 200. In another example, the solid oxide material 130 may be directly supplied to the furnace 200. In various example, the solid oxide material 130 may be directly supplied to and/or jointly with the E-waste material 110 to the furnace 200. The addition of the solid oxide material 130 to the furnace 200 creates a controlled reversion reaction removing primarily silicon and iron and/or residual aluminum if present. The exothermic reactions release large quantities of heat. For example, as to CuO as the solid oxide, the reaction equations for iron and silicon are shown below.

$$Fe_{(metal)} + CuO_{(solid\ 25°\ C.)} = FeO_{(slag)} + Cu_{(metal)} \quad (1)$$

Excess energy=160 KJ/kg of CuO added at 1600° C.

$$Si_{(metal)} + 2CuO_{(solid\ 25°\ C.)} = SiO_{2(slag)} + 2Cu_{(metal)} \quad (2)$$

Excess energy=2836 KJ/kg of CuO added at 1600° C.
Reactions (1) and (2) are calculated assuming solid cold CuO addition to molten metal at 1600° C. The excess energy results in the overall reduction in smelting energy required. In one example, these reactions may accompany formation of ferrous slags shown below.

$$FeO + SiO_{2(slag)} = 2FeO\text{---}SiO2_{(slag)} \quad (3)$$

The solid oxide material 130 may include CuO. In one example, the solid oxide material 130 may include 90 wt. % or higher of CuO. In another example, the solid oxide material 130 may include 1 wt. % or higher of $NiCO_3$. In another example, the solid oxide material 130 may include CuO and $NiCO_3$. In various examples, the solid oxide material 130 may include about 98 wt. % of CuO and about 2 wt. % of $NiCO_3$. A temperature of the furnace 200 may be maintained in the range of from about 1500 to 1630° C. for the reactions.

The recovered copper material from the furnace 200 may be transferred to a refining unit 300. The recovered copper material may be further processed with granulation 310. The copper material obtained from the reactions (1) and (2) may come with non-uniform size and shape. For most metallurgical reactors based on fixed or moving beds a certain void fraction is desired. This is achieved by a granulation process or other suitable process.

Hydrometallurgical processing of copper-bearing materials is usually done with the use of acidic or ammonia and/or ammonia carbonate leaching 320. After such leaching processes, the leach liquor formed is heated to distill off gaseous ammonia and carbon dioxide and precipitate copper values from the leach liquor via distillation 330. The recovered copper oxide after distillation 330 may be recycled as the solid oxide material 130. In one example, the recovered copper oxide may include CuO. In another example, the recovered copper oxide may include any of CuO and $NiCO_3$. Any of tin and/or lead obtained during the distillation 330 may be dissolved in fluoroboric acid 340 and subsequently go through electrowinning 350. Any of precious metals recovered may be further heat-treated 360. A plurality of pumps 370 and filter presses 380 may be located at various places as desired. A slag 710 formed during the smelting may be transferred to and/or disposed of in the slag collector 700.

Figure 2:
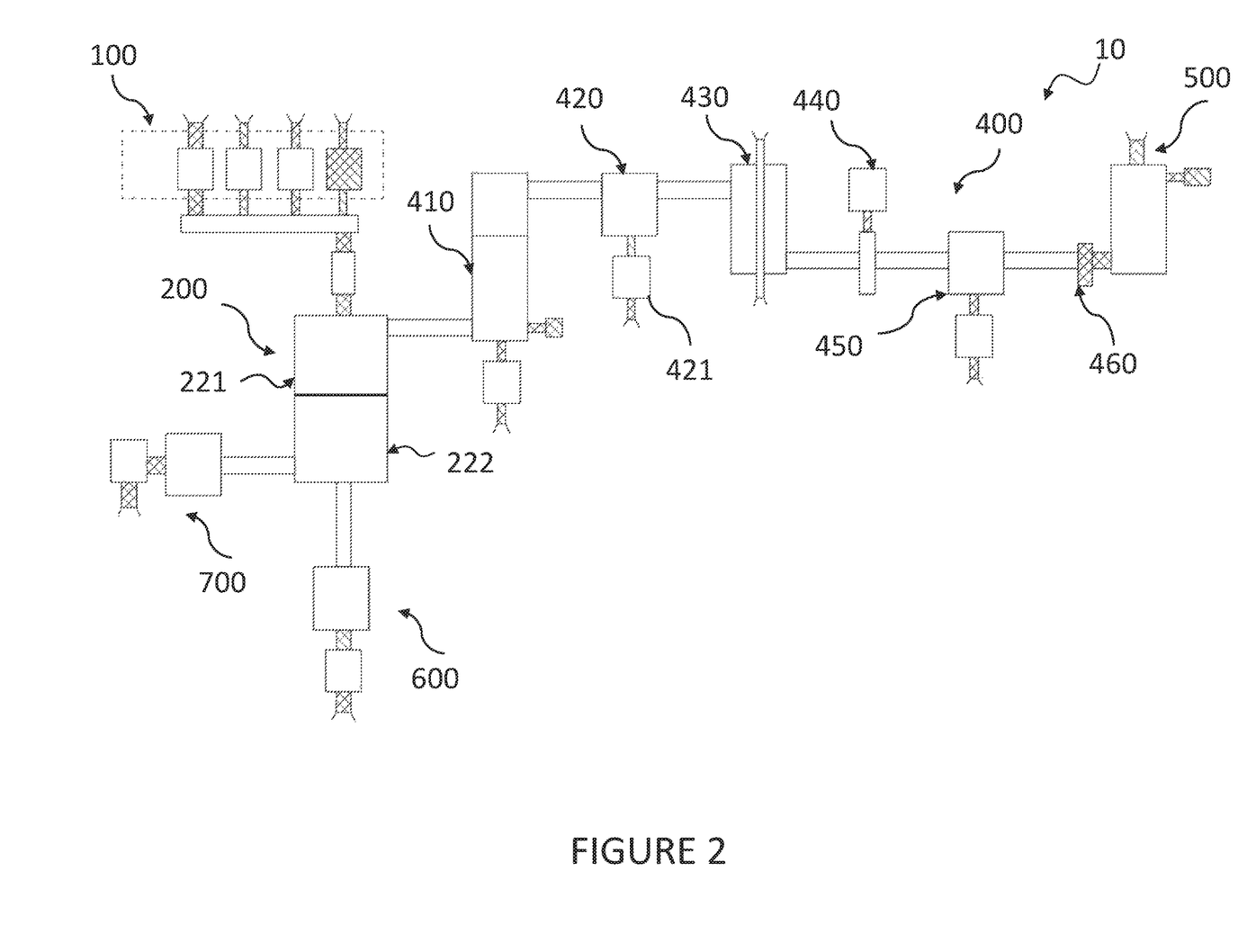
FIG. 2 shows a schematic diagram of another layout of the process according to the disclosure.

FIG. 2 shows another example of the recycling system 10. The recycling processes include gasification 221 of an organic fraction of the blended E-waste material and smelting/separation 222 of the metals. In one example, the gasification of the organic fraction and smelting/separation of the metals may be discrete. In another example, the discrete processes may take place in the furnace 200 at the same time. The gasification 221 is a process of partial oxidation such as combustion of a calorific material. The gasification 221 may occur in an oxygen starved environment and generate significant amounts of combustible gas. The gasification 221 includes injection of oxygen and water into the furnace 200. The main oxidant is oxygen, whilst water plays dual function i.e. facilitates the oxidation of the E-waste by acting as a secondary oxidant and controls the temperature of the gas generated during the process. In one example, both the gaseous oxygen and the water/wastewater may be injected into the furnace 200 simultaneously. In another example, they may be injected individually.

The E-Waste recycling system 10 may include an off-gas cleaning process 400. The furnace 200 produces an off-gas stream. The gas cleaning is carried out to prevent air pollution and to recover valuable elements. The off-gas stream may contain a limited amount of carbon char generated during the gasification 221 of the E-waste. The produced off-gas stream enters a thermal oxidizer (TO) 410 which converts the combustible gases and char into a fully oxidized flue gas.

From the thermal oxidizer 410, the off-gas may enter a high temperature-rated cyclone 420, which is configured to remove the coarse fraction of the dust in order to reduce the loading of the downstream candle filter 421. Cyclones are based on Stokes' law with modification for acceleration of centrifugal forces and thereby filter out large particulates. In a cyclone, the centrifugal acceleration may be many hundred times that of gravity with a corresponding increase in settling velocity and efficiency. Due to the presence of high particulate loadings and a smaller particle size fraction the cyclone 420 also reduces the risk to the downstream gas cooler (gas to air heat exchanger) fouling.

The heat exchanger 430 cools the off-gas by the exchange of process heat to ambient air. The heat exchanger 430 may cool the off-gas from a temperature of about 700° C. to around 400° C. by the exchange of process heat to ambient air, which is blown across stainless steel tubes containing the off-gas. There may be two heat exchangers for duty and standby in order to allow for the off-line cleaning during operation.

The off-gas cleaning process 400 may include filtration of fine particulates using a ceramic filter unit 440. This allows the filtration to be carried out above the prime de novo synthesis temperature for dioxins and furans. Hydrated lime may be injected upstream of the filter unit 440 to neutralize acid gas components. The entrained particulates are filtered in the ceramic filter unit 440. The entrained particulates may be pulsed and discharged to a dust recovery unit 450.

The generated gas may be evacuated from the furnace 200 by an induced draught (ID) fan 460, which drives the entire process by creating a slight suction pressure inside the furnace 200. This ensures the process gas stays within the ducts and vessels without egressing. The ID fan 460 relies on variable speed controls. The ID fan 460 may maintain the furnace 200 at 0 Pa or lower and therefore automatically compensates for the variable resistance of the off-gas system 400. In one example, the ID fan 460 may maintain the furnace 200 at from 0 to −100 Pa. In another example, the pressure of the furnace may be at about −25 Pa. The gas formed during the gasification of the E-waste may include species such as carbon dioxide, carbon monoxide, hydrogen, methane and some other volatile organic compounds (VOC), and/or a smaller amount of inert gas from a plasma electrode and various gas purges. It may also include particulate as a result of physiochemical carryover of the feed material. An accurate furnace pressure control may help to reduce it. The off-gas exiting the ID fan 460 may be transferred to storage silos 500. The molten metal obtained by the smelting is transferred to the metal storage 600. The slags are collected and/or disposed in the slag collector 700.

Figure 3:
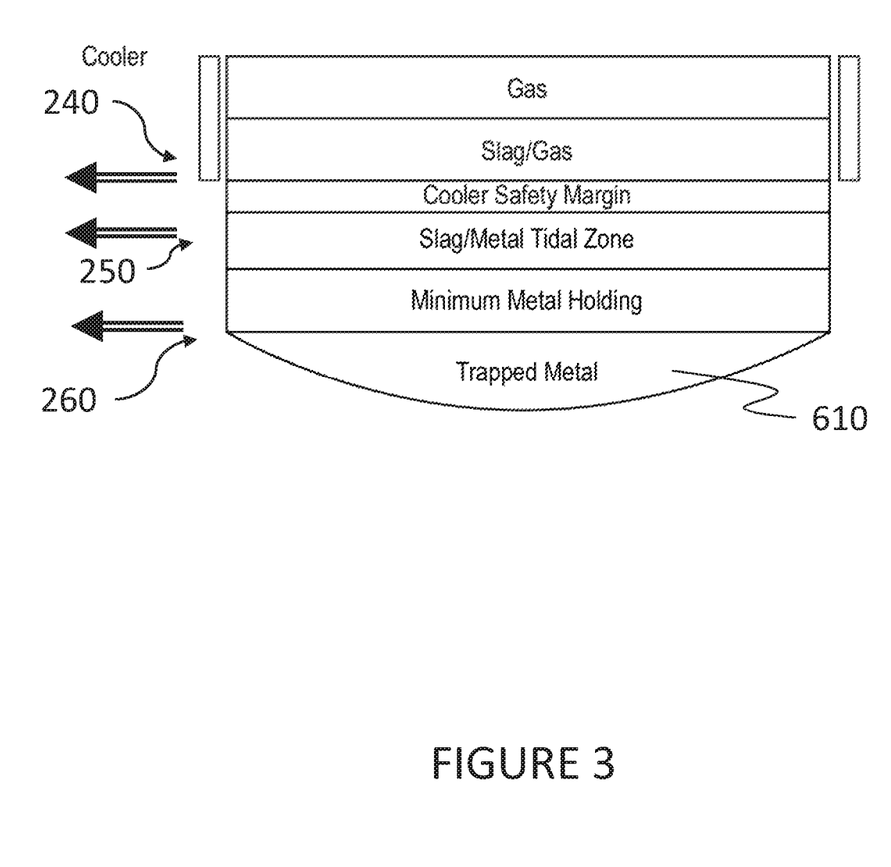
FIG. 3 illustrates a slag and molten metal formation in a furnace according to the disclosure.

Referring to FIG. 3, the smelting process may include filling the furnace hearth up to a slag overflow spout 240, commencing the slag overflow, continuing feeding until a design point volume of the alloy product is reached, and stopping the feed and tapping the alloy. The disclosed process is capable of smelting the feed and producing about 80% or higher of Cu alloy with one pyrometallurgical step.

During the smelting process the metallic constituents of the E-waste material get separated. Most of the inorganics and metals form a melt pool in the furnace 200, which includes two phases or layers, i.e. an upper molten layer of slag and a lower metallic layer containing majority of the precious metals. The slag includes oxides. The lower metallic layer may include copper, iron, and/or precious metals. In one example, some of the metallic constituents may undergo simultaneous reduction due to the highly reducing environment and react to form molten droplets which percolate through the slag scouring the precious metals into a collector alloy layer, which accumulates at the base of the furnace. In one example, copper oxide is fed into the furnace 200 with feeders 130 or 140 to oxidize metals.

In detail, the blended feed may be introduced to the furnace 200 until the melt pool has reached the required head of the melt above an outflow spout 240, at which time the feed is stopped and the melt pool is soaked in order to complete the ongoing reactions (1), (2). An exploratory dip test may be taken at this point to confirm the level and temperature of the melt pool. The slag safety zone (height/margin) of a slag line cooler may be generously sized. The outflow spout 240 is then opened, allowing the slag 710 to run into a slag collector 700 and the feeding restarts. A weir-like design of the slag overflow spout 240 may encourage a positive plug flow of the continuously managed removal of slag with any associated egress of process gases. From this point onwards samples of the overflow slag may be periodically taken from any of the overflow spout 240 and/or a middle tap hole 250 for analysis in order to control formulation. The results of the analysis may be fed back to the process operator. In one example, any slag containing metal values may be crushed and recycled to the miscellaneous feeder 140 to minimize metal losses.

The feeding continues until a design point volume of the metal alloy is reached. The design point volume may be estimated based on the composition of the E-waste and an amount of the material fed into the furnace 200. The feed is then stopped. The flow of the overflow slag may gradually arrest, with the termination of feeding, at which point a tap hole 260 is closed. If the volume of the molten material in the furnace is insufficient, the feeding of the blended material may be re-commenced to get to the required volume levels.

Once the required level or volume of the molten material in the furnace is confirmed, the main tap-hole 260 is opened to remove the alloy contents of the furnace. The alloy 610 may be tapped from the furnace 200 in a controlled way. The volume of the tapped alloy may be controlled in order to retain the holding volume. The holding volume may include the metal heel plus a minimum holding volume of the alloy in the furnace and slag head, which protects the refractory walls underneath the cooling panels. This is called a tidal zone operation where the movement of the metal-slag line is limited to a defined height. The design point volume of the tapped alloy may equate to the volume of the furnace's slag/metal tidal zone. In one example, the tapped alloy volume may be increased as desired.

Figure 4:
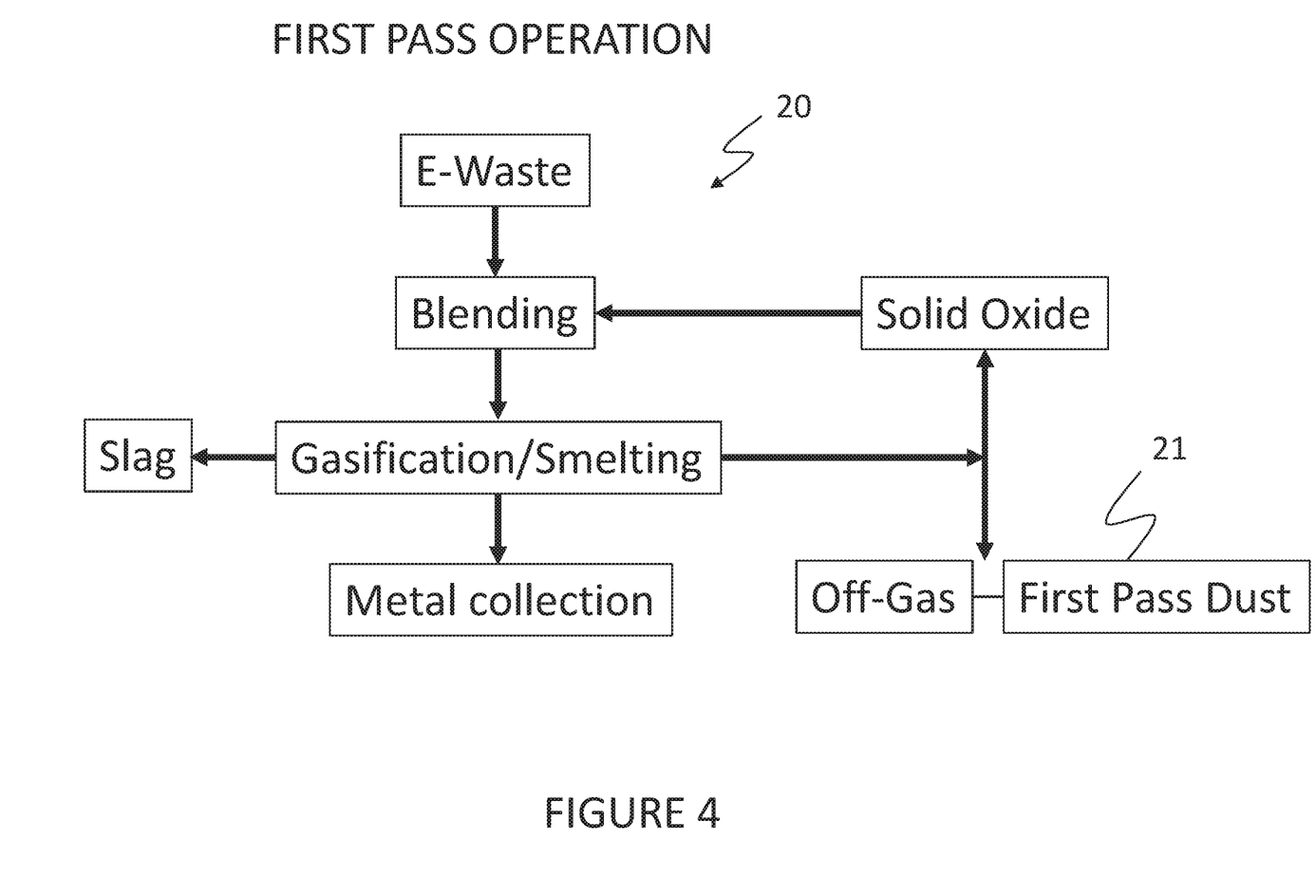
FIG. 4 shows a schematic diagram of first pass operation according to the disclosure.

Referring to FIG. 4, the E-Waste recycling system 10 carries out a first pass operation 20. The first pass operation 20 involves process of a raw E-waste stream. The first pass collector metal alloy 610 may include most of precious metals separated from the E-waste 100. In one example, the first pass collector metal alloy 610 may include copper, iron, tin, silicon and other base metals such as nickel, lead, manganese, chromium in smaller quantities.

The first pass dusts 21 recovered in the various off-gas system units 400 may be pneumatically transported to storage silos 500 (shown in FIG. 2), where they are stored until they get recycled and fed through the furnace 200 in order to recover the precious metals contained within the dusts or disposed of.

Figure 5:
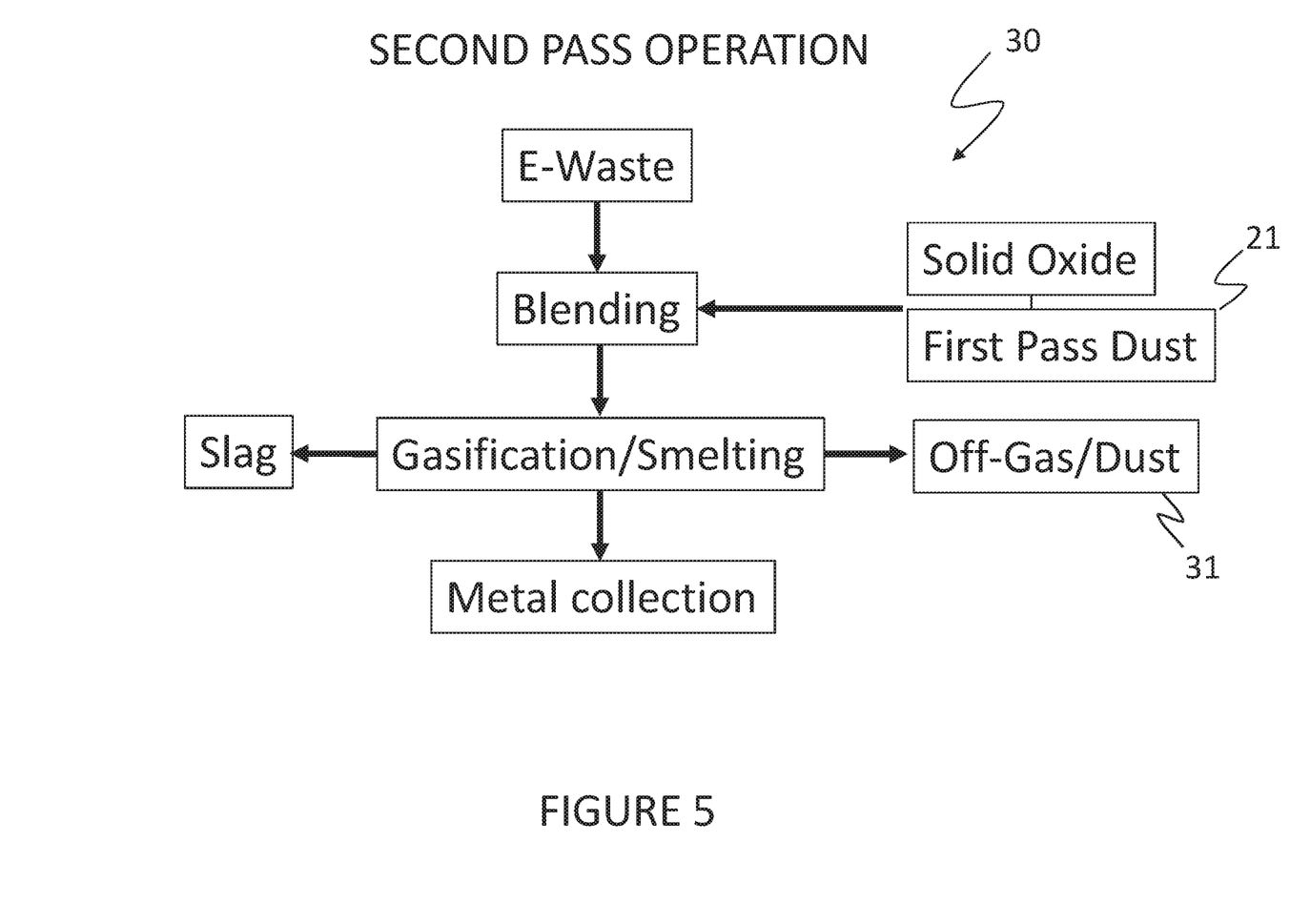
FIG. 5 shows a schematic diagram of second pass operation according to the disclosure.

In another example as shown in FIG. 5, the E-Waste recycling system 10 may carry out a second pass operation 30. The second pass operation 30 involves processing of a blended mixture of the E-waste 110 and the recovered first pass dust 21 during the first pass operation 20. The elemental base matrix of the alloy for the second pass operation 30 may be different from that of the first pass operation 20 as the second pass operation 30 may incorporate substantial amounts of lead. The composition of the slag for both passes may differ due to different characteristics of inputs. The dust 31 from the second pass operation 30 may be disposed of.

INDUSTRIAL APPLICABILITY

The disclosure may be applicable to any existing furnace Where control of solid oxide addition for E-waste recycling is desired. The E-waste 110 may include electronic waste such as circuit board, printed circuit board or the like. Specifically, the examples herein are related to controlling the reducing atmosphere during the smelting process to improve the overall efficiency.

Figure 6:
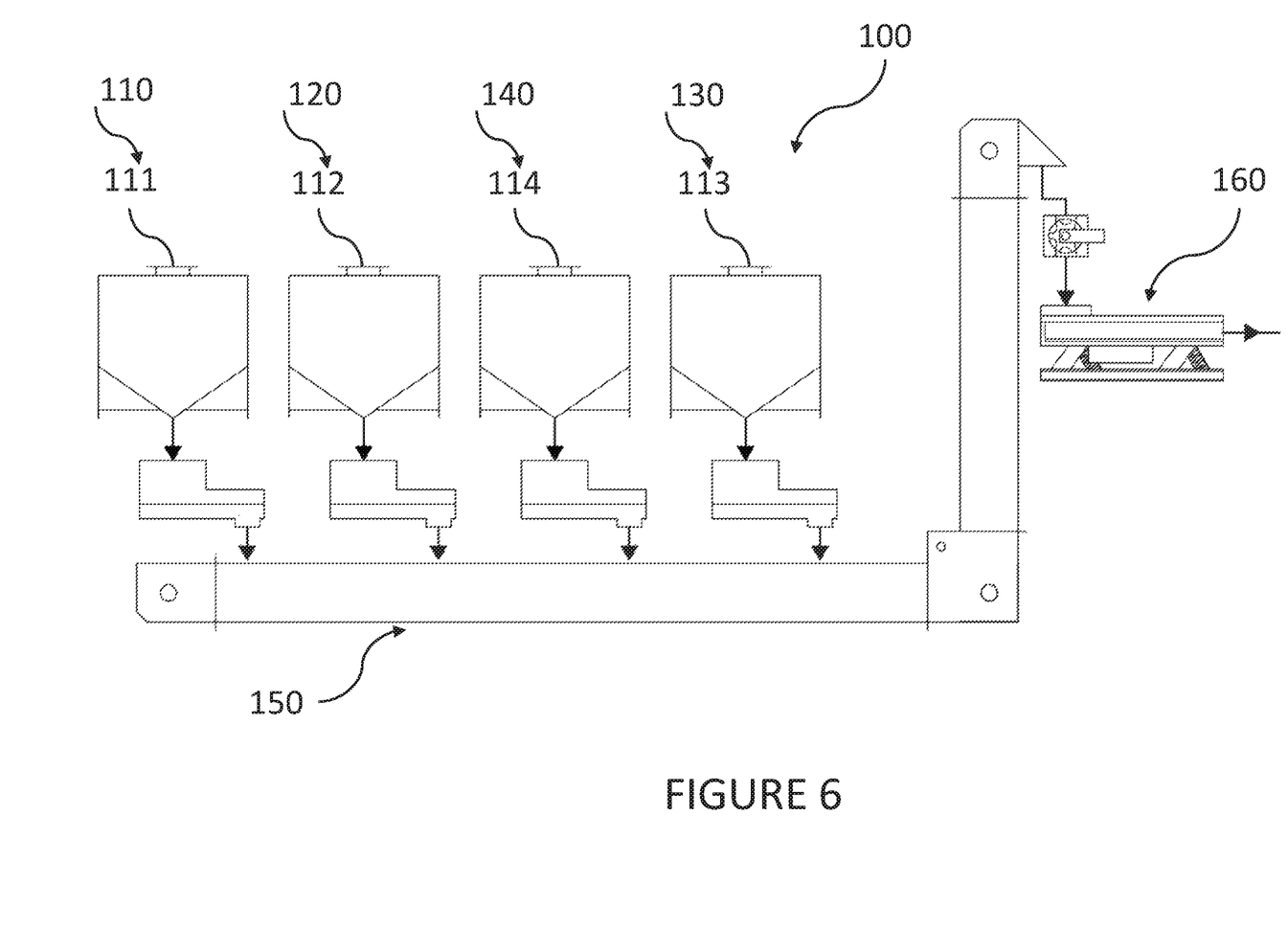
FIG. 6 illustrates an E-waste material blending unit according to the disclosure.

Referring to FIG. 6, the shredded E-waste 110 is transferred to the E-waste material blending unit 100, where it may be blended at the ground level with fluxing agents 120. The formulation and blending may be achieved by drawing the components from four individual loss-in-weight hoppers 111, 121, 131, 141 and dispensing them gravimetrically in flight into a bucket elevating conveyor 150. In one example, the hoppers may be combined in any combination of the four hoppers. The blended feed material may be then elevated above the furnace 200 (shown in FIG. 1) and conveyed to the furnace 200 through a conveyor 160 and fed to the furnace 200.

Figure 7:
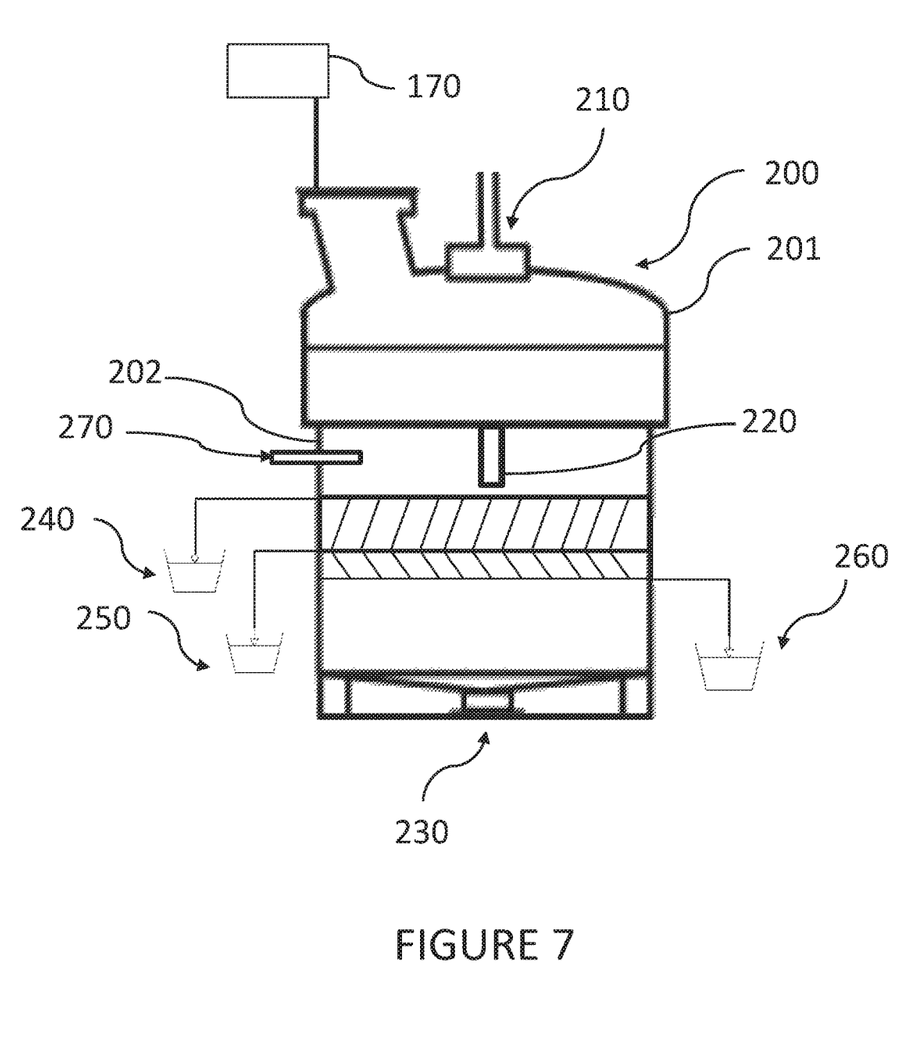
FIG. 7 illustrates an exemplary plasma arc furnace according to the disclosure.

The furnace 200 may be any form of smelting furnace such as induction furnace, electric furnace, blast furnace, plasma furnace or the like. As shown in FIG. 7, in one example, the blended feed material may be conveyed to the furnace 200 through a single leg drop chute 170 that is connected to a feed port on a roof 201 of the furnace 200, and be fed to the furnace 200 at a controlled rate. The chute 170 may be purged with nitrogen gas to minimize air ingress into the furnace 200. The blended E-waste 110 may be fed into the furnace 200 once the furnace refractory lining is hot and achieves a steady-state heat loss transfer. FIG. 7 shows an exemplary plasma arc furnace 200. After initial priming the furnace 200 may maintain a metal heal to protect the hearth. The content of the furnace may be continuously heated and melted down in a controlled environment using the plasma arc 210. The arc 210 may be provided by a single cathode electrode 220 in the roof 201 and held by an electrode manipulator having an arm and mast arrangement. The other end 230 of the conductive path for the arc may be in the base of the furnace and formed by steel clad brinks. An assembly of high current bus bars, connected to the copper anode collector plate may complete the current path back to a DC power supply.

Figure 8:
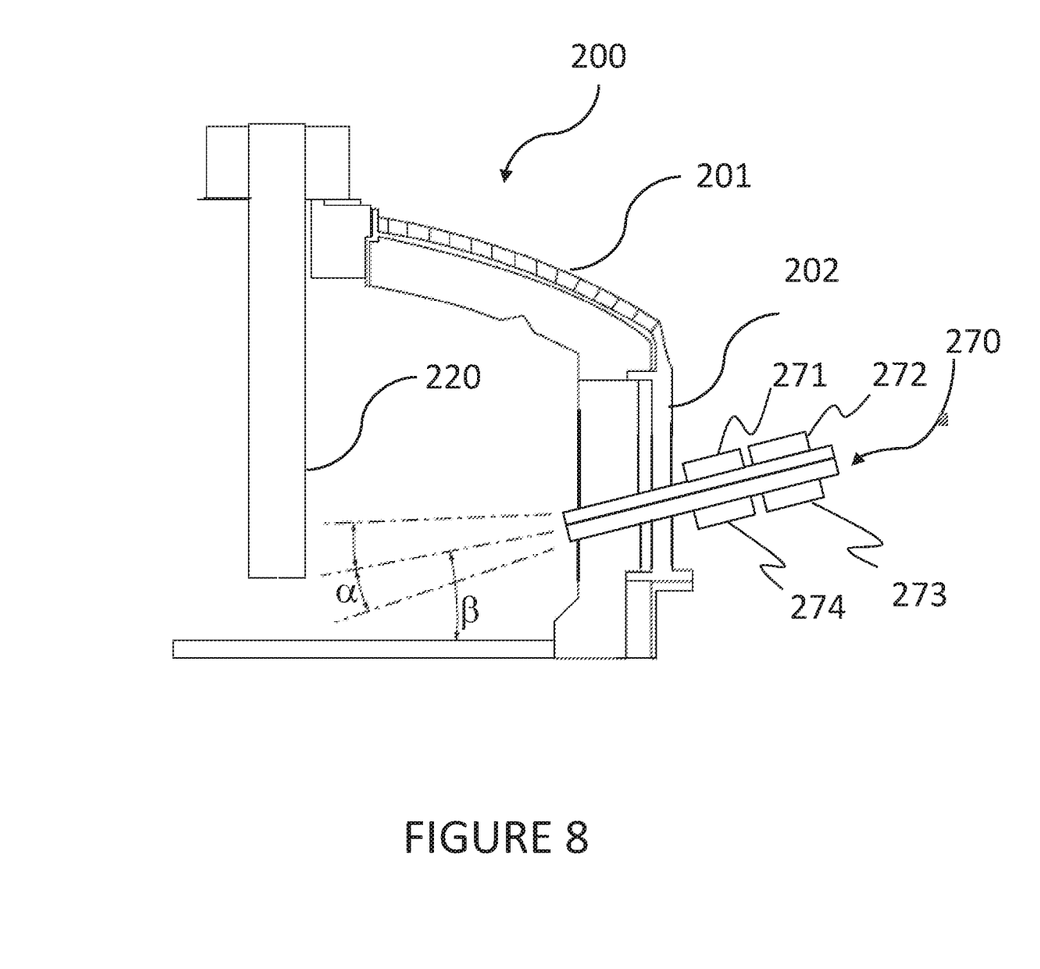
FIG. 8 shows a cross-section view of part of the plasma arc furnace.

The gasification 221 may be achieved by injection of oxygen and water or wastewater into a headspace 202 of the furnace 200 through four radially installed injection nozzles 270 (not shown for clarity purposes) at controlled flow rates. The gaseous oxygen and the water and/or wastewater may be injected into the headspace simultaneously but can be also injected individually. The injection rate of oxygen and water can be proportionally linked to the feed rate in the automatic mode or controlled manually. In one example, the injection nozzle 270 may be capable of injecting water and oxygen simultaneously in a controlled rate as shown in FIG.

8. Additionally the water injection may be automatically controlled by the temperature of the generated gas. The injection nozzle 270 may include Shield assembly 271. Injection nozzle assembly 272. Tapered mounting flange 273 and/or Nitrogen purge section 274. In one example, the injection may be directed to any direction inside the furnace. The injection may have an injection angle $\alpha$ for effective gaseous reactions where the injection angle $\alpha$ may be in the range of 2 to 45 degrees. In another example, the injection angle $\alpha$ may be about 16 degrees. If desired, a nozzle installation angle $\beta$ may be adjusted at an angle in the range of 1 to 45 degrees. In one example, the nozzle installation angle $\beta$ may be about 2 degrees.

The chemical composition of the E-waste 110 may have a degree of variability i.e. the organic to inorganic content. A number of parameters may be used to control reactions taking place in the furnace 200 i.e. the feed rate, the power input and the oxidants input. The controlled atmosphere makes it possible to essentially form a zero oxygen partial pressure by maintaining approximately about 25% carbon monoxide in the furnace off gas. The controlled injection of oxygen and water adjusts the amount of oxygen and water to provide a thermal balance and conversion of CO (carbon monoxide) to $CO_2$ (carbon dioxide).

The controlled reducing atmosphere may facilitate formation of Si (silicon) in the metal alloy from Silica-Alumina processes. This reaction oxidizes the aluminum in the E-waste to alumina ($Al_2O_3$) while reducing the Silica ($SiO_2$) to Si that reports to the alloy. It may also facilitate thermal energy by oxidizing and melting the feed. This allows for control of the energy balance and CO level in the furnace. A low off gas volume would be achieved as negligible or no oxygen/air is being blown into the bath.

Figure 9:
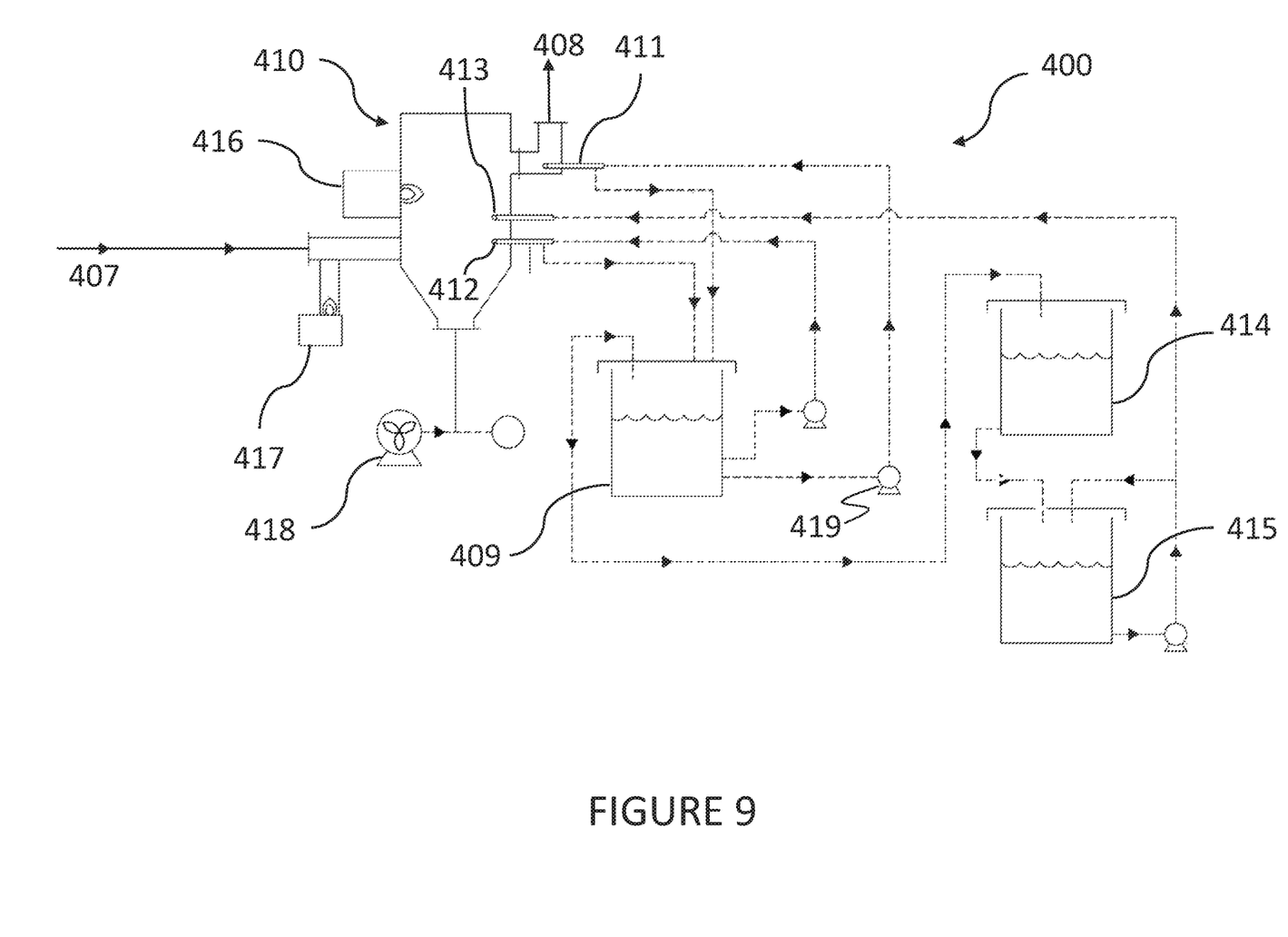
FIG. 9 shows a schematic diagram of an off-gas cleaning process according to the disclosure.

Referring to FIG. 9, the thermal oxidizer (TO) 410 converts the combustible gases and char 407 into a fully oxidized flue gas 408. The thermal oxidizer 410 may operate at a temperature in the range of from about 850° C. to about 1100° C. In one example, the thermal oxidizer 410 may come with two sets of water spray nozzles, the upper ones 411 and the bottom ones 412. Water 409 may be used for evaporative cooling. The injection of water is used to control the temperature and prevent a temperature of the thermal oxidizer 410 from rising too high. The water is also added through the top/upper sprays to control the dropout of the particulate with a target temperature. Most of the dust produced from the combustion process may be entrained in the off-gas stream exiting the thermal oxidizer 410. In another example, the thermal oxidizer 410 may include a urea injection 413 including its tanks 414, 415, which is used to reduce NOx emissions in case their actual levels in the final exhaust gas start to encroach emission limits.

Modulating gas burner 416, 417 are used to bring the thermal oxidizer 410 up to the required operating temperature. Additionally, a forced draught fan (FD) 418 such as an air combustion fan supplies primary air for the combustion of the process gas generated in the furnace. A plurality of pumps 419 may be placed as desired.

The outputs from the E-waste recycling process may include a collector metal alloy, slag, off-gas dust (fly ash) and cleaned off-gas. The first pass collector metal alloy may predominantly include copper, iron, fin, silicon and other base metals such as nickel, lead, manganese, chromium etc. in smaller quantifies. It may also contain the majority of the precious metals separated from the E-waste. The elemental base matrix of the alloy for the second pass may be different as it also incorporates substantial amounts of lead.

The vitrified slag product further treated from the system (termed Plasmarok®) is a stable, non-hazardous ceramic with properties resembling those of naturally occurring calcia-alumina-silicate minerals, coded as 190401 in the European Waste Catalogue (EWC). The compositions of the slags for both passes may differ with respect to each other due to different characteristics of inputs. The base slag is an $Al_2O_3$, CaO, $SiO_2$ slag. After the CuO addition, it may be lower in $Al_2O_3$ and CaO and higher in $SiO_2$ with significant FeO.

Process control of the slags may maintain a neutral slag chemistry with the potential being neither acidic nor basic. This enables the furnace 200 to operate at extremely high temperatures 1500° C. or above without causing damage to the refractory lining or water-cooled panels in the furnace 200. The basicity of the slags may be in a range of from 2.9 to 1.5.

Figure 10:
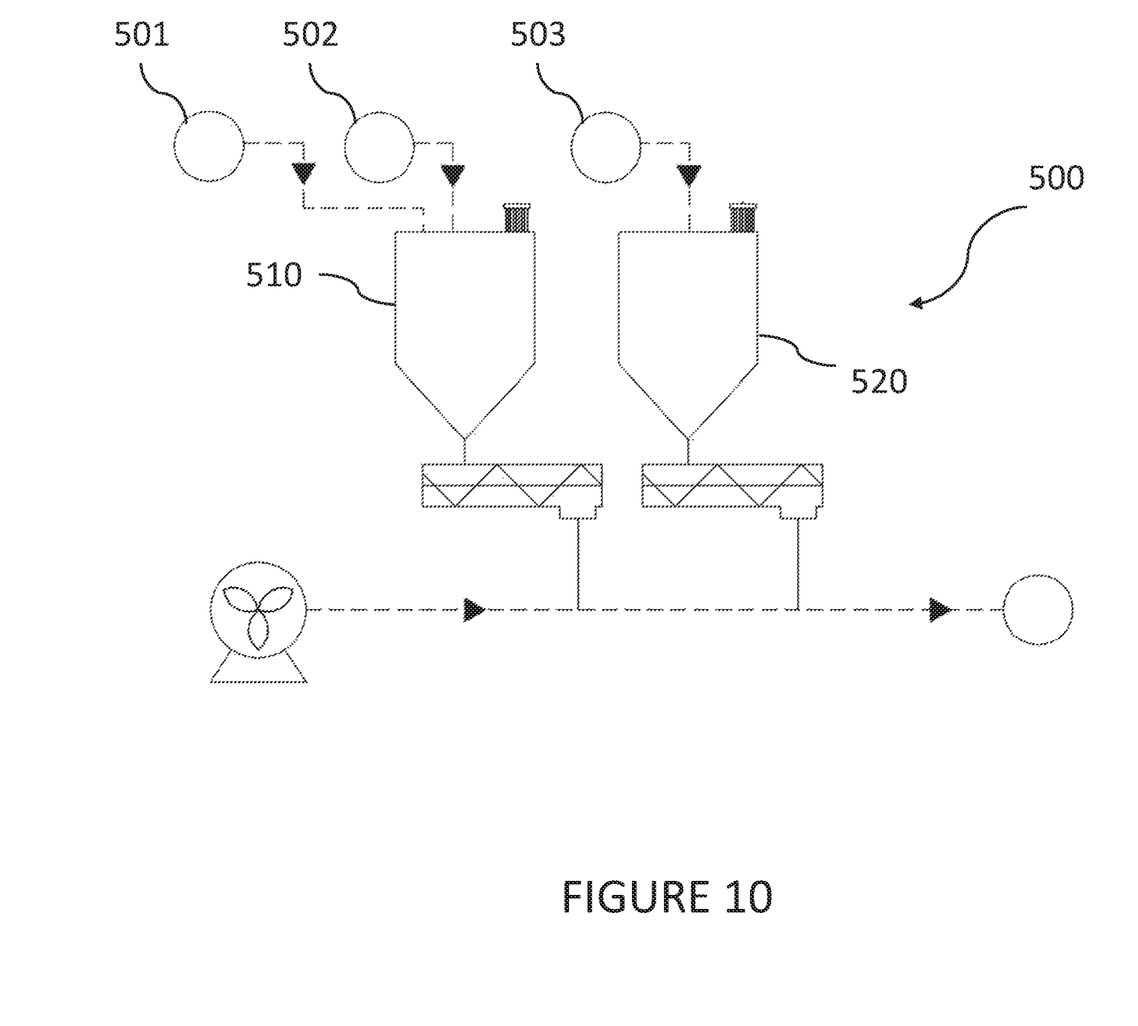
FIG. 10 shows a schematic diagram of a dust storage unit according to the disclosure.

Both modes of operation generate dust, which is captured in the off-gas system 400 and stored in the storage 500 as shown in FIG. 10. The dust may be collected from three different points of the off-gas system: the dust from the thermal oxidizer 501 and cyclonic separator 502 goes to a first silo 510 and the dust separated by a candle filter 503 goes a second silo 520. The first pass dust 21 is recycled back to the furnace 200 to be re-processed in the second pass operation 30 whereas the second pass dust may be disposed. The duration of the first pass operation 20 may be limited by the volume of the silos. During the first pass operation 20, 80-90% of the total dust may be diverted to the first silo 510. Once it fills up the plant's operation is switched to the second pass operation in order to recover the silver and remove the first pass dust from the silos.

The first pass operation 20 concerns the processing of the raw E-waste, whilst the second pass operation 30 is for re-processing of the dust generated and collected during the first pass operation. For the first pass operation 20, the first pass dust 21 may be highly oxidized. In the second pass operation 30, the chemical energy available from the raw E-waste may be lower due to the high proportion of the first pass dust 21 in the blended feed. In one example, the amount of the first pass dust 21 may be twice the amount of the raw E-waste 110. The second pass operation 30 may require between 16 and 40% more electrical energy compared to the first pass operation.

It is to be appreciated that certain features of the disclosure which are, for clarity, described herein in the context of separate examples, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself. As used herein, use of the term "comprising" should also support other embodiments utilizing the terms "consisting of" and "consisting essentially of."

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

We claim:

1. A method for recycling a material, comprising:
    carrying out a first pass operation, the first pass operation comprising:
        blending an E-waste material with fluxing agents, wherein the E-waste material includes Fe and Si;
        feeding a furnace with the blended E-waste material and a solid oxide material comprising CuO and $NiCO_3$; and
        smelting the blended E-waste material and the solid oxide material wherein the solid oxide material causes oxidation of the Fe to form a slag including iron oxide, to obtain the slag and a molten metal including copper.

2. The method according to claim 1, wherein the solid oxide material comprises 90 wt. % or higher of CuO.

3. The method according to claim 1, wherein the solid oxide material comprises 1 wt. % or higher of $NiCO_3$.

4. The method according to claim 1, wherein the solid oxide material comprises about 98 wt. % of CuO and about 2 wt. % of $NiCO_3$.

5. The method according to claim 1, wherein the fluxing agents include lime.

6. The method according to claim 1, further comprising:
    continuously feeding the furnace with the solid oxide material during the smelting.

7. The method according to claim 1, further comprising:
    carrying out gasification for combustion of a calorific material in an oxygen reduced environment in the furnace.

8. The method according to claim 7, further comprising: simultaneously carrying out the gasification and smelting.

9. The method according to claim 7, further comprising: simultaneously injecting oxygen and water for the gasification to control the oxygen reduced environment in the furnace.

10. The method according to claim 1, wherein
    during the smelting, exothermic reactions (1) and (2) occur wherein $$Fe_{(metal)} + CuO_{(solid)} = FeO_{(slag)} + Cu_{(metal)} \quad (1)$$

$$Si_{(metal)} + 2CuO_{(solid)} = SiO_{2(slag)} + 2Cu_{(metal)} \quad (2).$$

11. The method according to claim 10, wherein ferrous slags are formed according to formation reaction (3) wherein $$FeO + SiO_{2(slag)} = 2FeO\text{---}SiO_{2(slag)} \quad (3).$$

12. The method according to claim 1, further comprising maintaining the furnace at a temperature in a range of from about 1500° C. to 1630° C. during the smelting.

13. The method according to claim 1, further comprising:
    collecting a first pass dust generated during the first pass operation; and
    storing the first pass dust in a storage.

14. The method according to claim 13, further comprising:
    carrying out a second pass operation, the second pass operation comprising:
        blending the first pass dust with a raw E-waste material to produce a blended E-waste material; and
        feeding the furnace with the blended E-waste material.

15. The method according to claim 14, wherein an amount of the first pass dust is larger than an amount of the raw E-waste material in the blended E-waste material.

16. The method according to claim 14, further comprising:
    sequentially carrying out the first pass operation and the second pass operation.

17. The method according to claim 1, wherein the molten metal includes precious metals.

18. The method according to claim 17, wherein the precious metals include at least one of Au, Ag, and Pd.

19. The method according to claim 1, wherein the molten metal further includes at least one of iron, tin, silicon, nickel, lead, manganese and chromium.

20. A method for recycling a material, comprising:
    carrying out a first pass operation, the first pass operation comprising:
        blending an E-waste material with fluxing agents, wherein the E-waste material includes Fe and Si;
        feeding a furnace with the blended E-waste material and a solid oxide material comprising CuO and $NiCO_3$; and
        smelting the blended E-waste material and the solid oxide material wherein the solid oxide material causes oxidation of at least one of the Si or the Fe to form a slag, to obtain the slag and a molten metal including copper.

21. The method according to claim 20, wherein the solid oxide material comprises 90 wt. % or higher of CuO.

22. The method according to claim 20, wherein the solid oxide material comprises 1 wt. % or higher of $NiCO_3$.

23. The method according to claim 20, wherein the solid oxide material comprises about 98 wt. % of CuO and about 2 wt. % of $NiCO_3$.

24. The method according to claim 20, further comprising:
    continuously feeding the furnace with the solid oxide material during the smelting.

25. A method for recycling a material, comprising:
    carrying out a first pass operation, the first pass operation comprising:
        blending an E-waste material with fluxing agents, wherein the E-waste material includes at least one of Fe and Si;
        feeding a furnace with the blended E-waste material and a solid oxide material comprising CuO and $NiCO_3$; and
        smelting the blended E-waste material and the solid oxide material wherein the solid oxide material causes oxidation of the at least one of the Si or the Fe to form a slag, to obtain the slag and a molten metal including copper.

26. The method according to claim 25, wherein the solid oxide material comprises 90 wt. % or higher of CuO.

27. The method according to claim 25, wherein the solid oxide material comprises 1 wt. % or higher of $NiCO_3$.

28. The method according to claim 25, wherein the solid oxide material comprises about 98 wt. % of CuO and about 2 wt. % of $NiCO_3$.

29. The method according to claim 25, further comprising:

continuously feeding the furnace with the solid oxide material during the smelting.

\* \* \* \* \*